Patented Dec. 7, 1937

2,101,223

UNITED STATES PATENT OFFICE 2,101,223

CHEMICAL PROCESS

Joseph Grange Moore, Runcorn, England, assignor to Imperial Chemical Industries Limited, a corporation of Great Britain No Drawing. Application September 7, 1935, Serial No. 39,625. In Great Britain September 24, 1934

6 Claims. (Cl. 260—1)

This invention relates to a process for the manufacture of chlorinated rubber products of improved stability.

The production of solid chlorinated rubber by the action of chlorine on solutions or dispersions of rubber in a suitable liquid such as carbon tetrachloride, and the subsequent removal of the solvent by evaporation, is a well known process. Certain disadvantages in the resulting products have, however, been observed and their cause has been largely due to the tendency of the chlorinated rubber to evolve small amounts of hydrochloric acid, particularly at moderately elevated temperatures. Numerous proposals which have been made with the object of minimizing this acid evolution are largely based on the treatment of the chlorinated product with basic materials, or on the incorporation of a basic material with the chlorinated rubber. The latter method is apparently designed to ensure the absorption by the base of any hydrochloric acid which may be evolved, but for certain purposes the presence of such foreign materials may be undesirable.

This invention has as an object the provision of a process for the preparation of chlorinated rubber of improved stability. A further object is the chlorinated rubber of improved stability thus obtained. Other objects will appear hereinafter.

These objects are accomplished by the following invention wherein chlorinated rubber in solution in an inert organic solvent, preferably a volatile solvent, is treated with an antichlor, i. e. a substance, usually a reducing agent, which reacts with free chlorine or oxidizing chlorine compounds such as hypochlorites.

In carrying out the invention it is found to be advantageous first to chlorinate a solution of rubber in carbon tetrachloride beyond the point at which chlorine appears to be absorbed readily by the solution, as thereby there is obtained as the initial material a product which would be more stable than a lower chlorinated product. The chlorinated mass is then treated with the antichlor in aqueous solution. Thus, if a fully chlorinated rubber solution is injected into boiling water containing 2% of sodium bisulfite in solution, a more stable solid product is obtained than if the same chlorinated rubber solution were injected into boiling water without antichlor.

Preferably, however, the contact between the chlorinated rubber and the antichlor should be as intimate as possible. For this reason it has been found to be advantageous to cause an emulsification or dispersion of the solution of chlorinated rubber with a solution of the antichlor. This may be conveniently effected by vigorous agitation, after which a solid chlorinated rubber may be produced by precipitation with alcohol or by evaporating the solvent. A convenient method of evaporating the solvent is to inject the emulsion of the solutions of chlorinated rubber and antichlor into boiling water. The solid chlorinated rubber is then recovered by screening and is preferably washed very thoroughly with water to remove residual traces of the inorganic salts introduced by the stabilizing treatment.

The following experiment illustrates one method of carrying out the invention and demonstrates the improved results obtained thereby.

Two 10% solutions of chlorinated rubber in carbon tetrachloride were prepared, in one case the chlorinated rubber contained 63.3% combined chlorine and in the other 65.1%. A portion of each solution was injected into boiling water and the solid product obtained washed and dried. The remaining portion of each solution was emulsified by vigorous stirring with an equal volume of a 1% aqueous solution of sodium bisulfite for three hours. Solid products were then obtained by injecting the emulsions into boiling water, after which the solids were washed till neutral and dried. Comparative tests were then carried out by passing a constant stream of nitrogen over a weighed sample of each product maintained at 130° C. for 50 hours. The hydrogen chloride evolved in each case was absorbed and determined; the results obtained were as follows, the hydrogen chloride evolved being expressed as a percentage on the weight of the chlorinated rubber:

| Sample containing | HCl evolved by | |
|---|---|---|
| | Treated material | Untreated material |
| Percent | Percent | Percent |
| 63.3 Cl$_2$ | 0.15 | 0.44 |
| 65.1 Cl$_2$ | 0.16 | 0.24 |

While in the above example there are disclosed a convenient antichlor and solvent, and the relative concentrations, proportions and times which are useful in the practical application of the process, it is to be understood that these data are not critical.

Antichlors in general may be employed, including sulfurous acid, sodium, potassium and ammonium sulfites, bisulfites, and thiosulfates, calcium and magnesium bisulfites etc. It is preferred, however, to use the sodium salts of sulfurous acid.

In place of the carbon tetrachloride exemplified above, inert organic solvents in general may be employed, volatile inert solvents being preferred. While chlorinated rubber is generally obtained in solution in a chlorinated hydrocarbon solvent such as chloroform or carbon tetrachloride, since the rubber may be chlorinated in such solvents, other inert solvents such as benzene, toluene, naphtha etc. may be employed. Thus, chlorinated rubber may be separated from solution in the chlorination solvent and redissolved in the appropriate solvent and then stabilized according to the process of the present invention.

The relative proportions and the concentration of the antichlor may also be varied within wide limits. It has been found that chlorinated rubber of improved stability can be obtained by treatment with aqueous solutions of antichlor of as low a concentration as 0.02%, and with the proportion of antichlor solution to chlorinated rubber solution as low as 1:8.

It is also to be understood that the further addition of antacids or other additional stabilizer to the chlorinated rubber after the treatment with antichlor is not precluded if it is found that the advantages thereby obtained outweigh the disadvantages occasioned by the introduction of foreign substances.

The above description and examples are intended to be illustrative only. Any modification of or variation therefrom which conforms to the spirit of the invention is intended to be included within the scope of the claims.

I claim:

1. Process for stabilizing chlorinated rubber which comprises emulsifying a solution of chlorinated rubber in carbon tetrachloride with an aqueous solution of sodium bisulfite, and separating the chlorinated rubber from the liquid components.

2. Process for stabilizing chlorinated rubber which comprises emulsifying a solution of chlorinated rubber in carbon tetrachloride with an aqueous solution of a soluble sulfite, and separating the chlorinated rubber from the liquid components.

3. Process for stabilizing chlorinated rubber which comprises emulsifying a solution of chlorinated rubber in a volatile inert organic solvent with an aqueous solution of a soluble sulfite, and separating the chlorinated rubber from the liquid components.

4. Process for stabilizing chlorinated rubber having a chlorine content of the order of 65% which comprises emulsifying a solution of said chlorinated rubber in carbon tetrachloride with an aqueous solution of sodium bisulphite, and separating the chlorinated rubber from the liquid components.

5. Process of stabilizing chlorinated rubber having a chlorine content of the order of 65% which comprises emulsifying a solution of said chlorinated rubber in carbon tetrachloride with an aqueous solution of a soluble sulphite, and separating the chlorinated rubber from the liquid components.

6. Process of stabilizing chlorinated rubber having a chlorine content of the order of 65% which comprises emulsifying a solution of said chlorinated rubber in a volatile inert organic solvent with an aqueous solution of a soluble sulphite, and separating the chlorinated rubber from the liquid components.

JOSEPH GRANGE MOORE.